Figure 1:
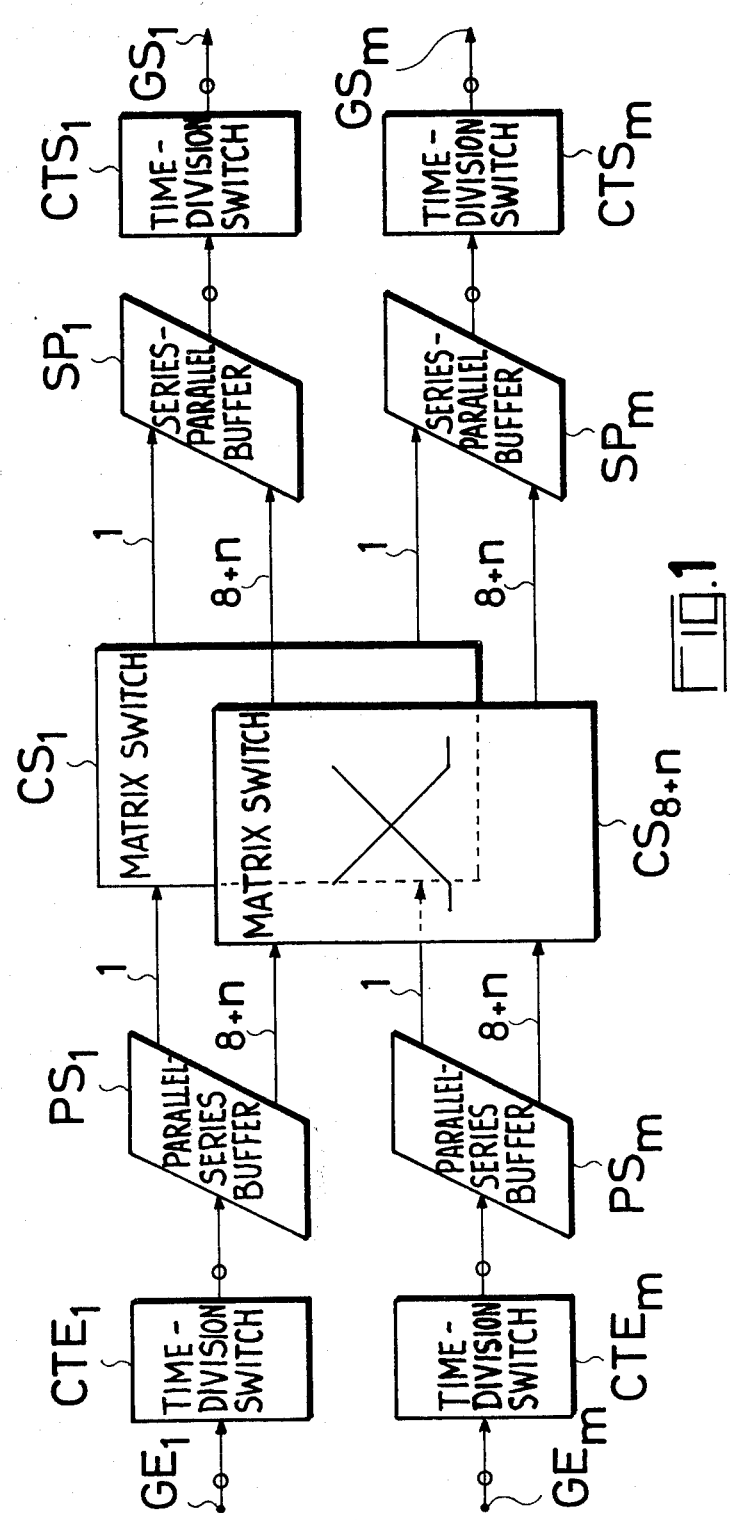

United States Patent [19]

Charransol et al.

[11] 4,074,077

[45] Feb. 14, 1978

[54] TST EXCHANGE WITH SERIES-MODE SPACE SWITCHING STAGE

[75] Inventors: Pierre Charransol; Jacques Hauri; Claude Athenes, all of Paris, France

[73] Assignee: Thomson-CSF, Paris, France

[21] Appl. No.: 684,964

[22] Filed: May 10, 1976

[30] Foreign Application Priority Data

May 13, 1975 France ............................. 75 14875

[51] Int. Cl.$^2$ ............................................. H04J 3/00
[52] U.S. Cl. ................................................ 179/15 AT
[58] Field of Search ......... 179/15 BF, 15 AQ, 15 AT

[56] References Cited

U.S. PATENT DOCUMENTS

| 3,129,407 | 4/1964 | Paull | 179/15 AQ X |
| 3,864,525 | 2/1975 | Edstrom et al. | 179/15 AQ |
| 3,865,991 | 2/1975 | Charransol et al. | 179/15 BF |
| 3,886,318 | 5/1975 | Charransol et al. | 179/15 BF |
| 3,906,164 | 9/1975 | Philip et al. | 179/18 EA |
| 3,920,914 | 11/1975 | Regnier et al. | 179/15 AT |
| 3,925,620 | 12/1975 | Edstrom et al. | 179/15 AT |
| 3,983,330 | 9/1976 | Tongi | 179/15 AT |

Primary Examiner—Thomas W. Brown
Attorney, Agent, or Firm—Cushman, Darby & Cushman

[57] ABSTRACT

The invention relates to time-division exchanges in which the connection between the subscribers is established successively in time at the same frequency as a sampling of telephone signals. It consists in carrying out the spatial multiplex switching stage simultaneously on $k$ words in series mode, each word using a separate spatial multiplex switch. A spatial multiplex switching stage with $k$ independent elements is thus provided.

4 Claims, 2 Drawing Figures

FIG.1

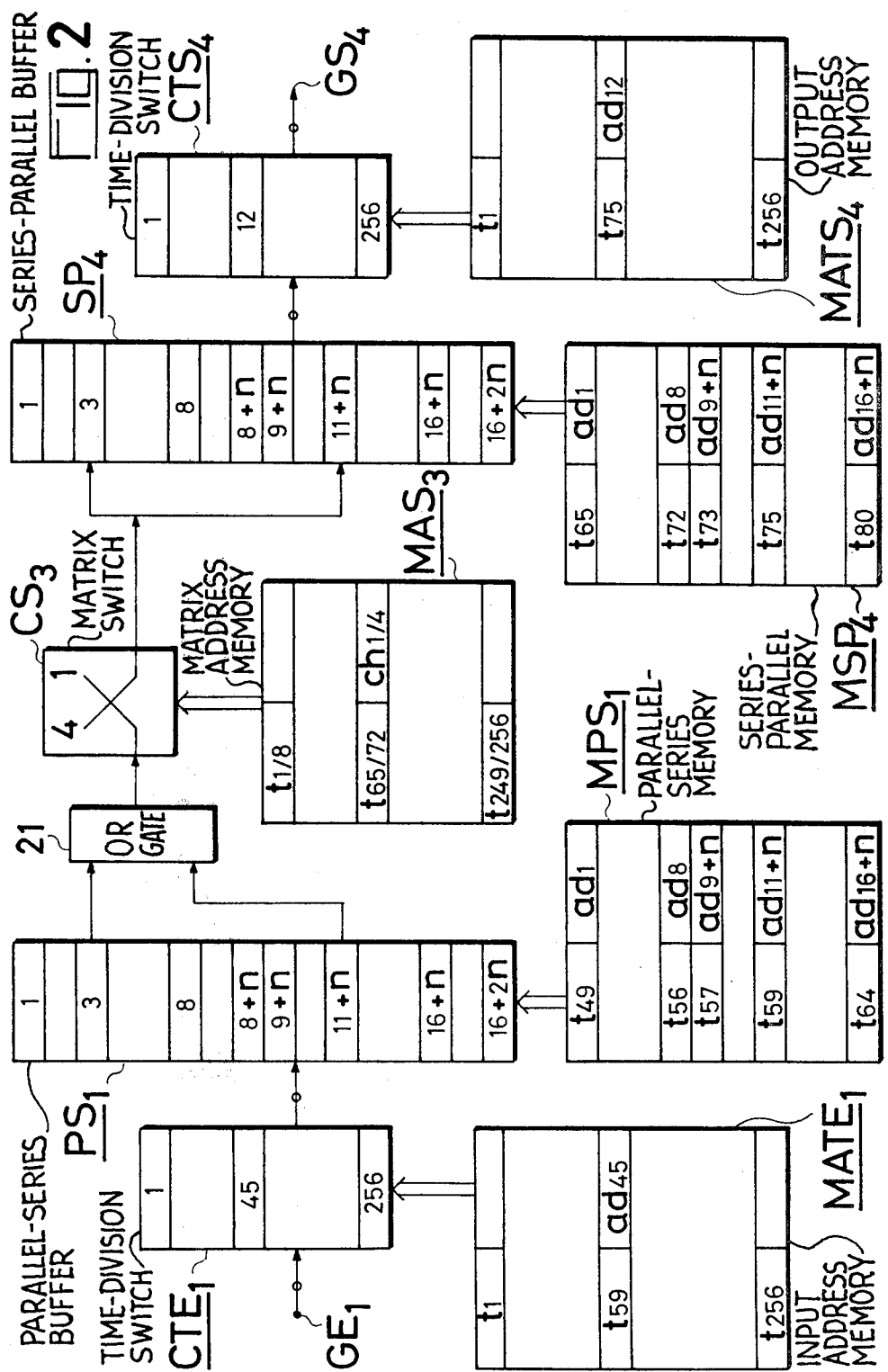

TST EXCHANGE WITH SERIES-MODE SPACE SWITCHING STAGE

This invention relates to time-division exchanges, in which the connection between the subscribers is established successively in time at the same rate as a sampling of telephone signals. The invention also relates to methods reshaping an exchange of this kind.

These signals are generally sampled at a frequency of 8kc/s, after which the value of each sample is coded by a number of 8 bits. In most cases, this is followed by concentration which makes it possible, for example, to reduce the number of subscribers capable of being simultaneously connected from 256 to 32, the others awaiting a free connection. The degree of concentration is governed by the traffic expected on the subscriber lines which is known statistically. In general, the concentration circuit then delivers a frame of 32 channels multiplexed in time which is supported by a so-called multiplex junction circuit. It is also possible to carry out concentration with analogue samples, followed by encoding.

The above mentioned numerical values are not critical, although they are generally used because of national and international standards.

One significant problem is to guarantee adequate safety of operations in the event of failure of an element so that, instead of all the lines served by the automatic switching system having to be taken out of service, the blocking level is merely increased to a small extent.

One solution to this problem is described in French Patent Application No. 75.05799. It comprises dividing shaping of an exchange of the type in question into n identical and independent sections connected at the level of the space-division switches by n busbars. Considering these spatial multiplex switches thus connected as a whole, it is apparent that they could be placed in the form of a matrix with $n$ inputs and $n$ outputs comprising $n^2$ connection points.

In the case of a high-capacity exchange this number of connection points would be too high. One known solution to this problem comprises using a multistage spatial multiplex switching network made up of a large number of matrices of small dimensions. Finally the number of connection points of these matrices as a whole is distinctly below $n^2$, but it is no longer possible to return to the structure described above and the preceding protection system is no longer applicable.

However, protection is essential, especially at the level of the spatial multiplex switch, because switching matrices are integrated in one and the same housing in which the failure of one element has consequential effects on all the others. Taking as an example a very simple integrated circuit comprising 4 multiplexers with 8 multiple inputs and used in the normal way in a connection network operating in parallel mode at a frequency of 2 MHz, this circuit will be used for more than 1000 calls. A failure of a circuit such as this is extremely serious.

Various processes for replacing all or some of the safety elements of the switching network have already been proposed. These processes are attended by the disadvantage of requiring a large number of switches which, even if they are of the static type, may themselves be the origin of failures. In addition, the rescue switching procedure is complex and involves the loss of a large number of calls.

In accordance with the present invention a time-division exchange is provided for switching binary words of $k$ bits from a plurality of incoming parallel-mode PCM junctions to a plurality of output parallel-mode PCM junctions, said exchange comprising:

first time-division switching means connected to said incoming PCM junctions for delivering said binary words in parallel mode;

parallel-series conversion means for receiving said binary words from said first time-division switching means and delivering said binary words in series mode on $k + n$ pluralities of input connections;

matrix switching means connected to said $k + n$ pluralities of input connections for delivering said binary words in series mode on $k + n$ pluralities of output connections; said matrix switching means being divided into $k + n$ independent distinct elements, each of said elements being connected respectively to one of said pluralities of input connections and to one of said pluralities of output connections and presenting to said binary words a plurality of paths between said input connections and said output connections;

series-parallel conversion means connected to said $k + n$ pluralities of output connections for delivering said binary words in parallel mode; and second time-division switching means connected to said series parallel conversion means for delivering said binary words to said plurality of output parallel-mode PCM junctions.

For a better understanding of the invention, and to show how the same may be carried into effect, reference will be made to the ensuing description and to the attached figures among which:

FIG. 1 diagrammatically illustrates an exchange according to the invention;

FIG. 2 diagrammatically illustrates the progress of a conversation sample through an exchange of this kind.

The various switching elements of an exchange according to the invention are illustrated in FIG. 1. This FIG. does not show the various corresponding control elements or the concentration means or the input and output multiplexing means, all of which operate in known manner. Similarly, FIG. 1 only shows the first and the last of identical elements performing the same function. The figures are purely illustrative and correspond to the standards commonly used.

The coded samples arrive at the input of the illustrated part of this exchange on m input multiplex groups $G E_1$ to $G E_m$ in the form of words of 8 bits presented in parallel mode on 8 wires and arriving successively in time. Each multiplex group comprises a P C M frame of 256 successive samples each arriving at elementary times $t_1$ to $t_{256}$, so-called channel times. It is assumed that all these times are in phase in all the incoming and outgoing groups and for all the elements of the exchange.

The coded samples depart in the same way on m output multiplex groups $G S_1$ to $G S_m$ corresponding to the input groups.

These coded samples are switched in time division in known manner both in m input time-division switches C T $E_1$ to C T $E_m$ and in m output time-division switches C T $S_1$ to C T $S_m$. These switches are memories each comprising 256 words of 8 bits. At each elementary time each memory receives one word of 8 bits and emits another, these words being entered and read in parallel mode. The parallel connections are denoted by an arrow with a circle whilst the series connections are denoted by an arrow only.

The words issuing from the C T Es reenter the parallel-series buffer memories P $S_1$ to P $S_m$ in parallel mode. The words which enter the C T Ss leave the series-parallel buffer memories S $P_1$ to S $P_m$ in parallel mode.

Each of these buffer memories is divided into two submemories of $8 + n$ words of 8 bits. Only 8 of these words are used in each memory in normal time, the others being held in reserve. In a parallel-series buffer memory, these 8 words are successively entered in parallel mode and then read simultaneously in series mode. Thus, the input and output flow of binary elements is always the same, which it has to be, although it is also necessary for all the 8 words to be entered before being read and it is for this reason that two sub-memories are used, of which one is filled whilst the other is read in an alternating sequence. In a series-parallel buffer memory, the 8 words are simultaneously entered in series mode and then read successively in parallel mode.

The words which depart in series from the P Ss are conventionally switched in known manner in $8 + n$ independent matrix switches C $S_1$ to C $S_{8+n}$. In the interests of convenience, these space-division switches are shown in the form of single matrix $m \times m$, although this is not meant to prejudge their actual structure. The words issuing from these C Ss then re-enter the series-parallel buffer memories S P.

It is essential to point out that each C S is connected to all the words of the same order (order = number in the order of natural succession) in the P Ss and the S Ps and to these words only. Independent elements composed of one C S and words of the same order in the P Ss and S Ps are thus obtained, any word of that order of a P S being able to be switched into any word of that order of an S P.

Since the matrix switches are made up of independent units, it is obvious that, under these conditions, a failure in one of them, i.e., C $S_3$ for example, will not affect the others and that only the paths passing through a word No. 3 of a P S or an S P will be unusable. This gives a first possibility of protection against such a failure which, at the level of the central unit responsible for allocating these paths, is based on the fact that this central unit does not allocate the paths rendered unusable by the failure, a result achieved very simply for example by changing the value of a bit marking the words in question. The failure can thus be repaired without any redundancy but simply with a reduction of one eighth in the traffic capacity of the exchange.

A second possibility comprises allocating the traffic passing through the defective matrix switch to one of the n safety switches. This result is also achieved very simply at the level of the central unit by replacing the addresses of the words of the P Ss and S Ps of order corresponding to the failure by the addresses of the words of a safe order and by allocating the paths to the safety switch selected.

FIG. 2 shows by way of example the progress through the exchange of a coded sample which is represented by the word 45 of the input multiplex group G $E_1$ and which terminates at the word 12 of the output multiplex group G $S_4$. The arrows with a circle represent parallel connections, the ordinary arrows represent series connections and the thick arrows represent functional control connections. The boxes in C T $E_1$, P $S_1$, S $P_4$ and C T $S_4$ represent words and contain an indication of the addresses of these words. The double boxes in M A T $E_1$, M P $S_1$, M S $P_4$ and M A T $S_4$ represent words and, on the left, contain an indication of the reading time of these words and, on the right, an indication of their content.

The sample in question enters a time-division input switch C T $E_1$ which is a memory organised into 256 words of 8 bits. The words of G $E_1$ are entered in C T $E_1$ at the addresses corresponding to their order of arrival under the control of an internal circuit. In the example, the word 45 of G $E_1$ is entered in the word No. 45 of C T $E_1$.

C T $E_1$ is read under the control of a time-division input address memory M A T $E_1$ which is a memory organised into 256 words and whose content is determined by the central control unit of the exchange. The words of this memory are read synchronously with the channel times $t_1$ to $t_{256}$ and their content indicates the address of the word which is to be read in C T $E_1$ at the moment the word of M A T $E_1$ is read. In the example, the address ad 45 is read at the time $t_{59}$ so that the word 45 of C T $E_1$ is read at time $t_{59}$. It leaves in parallel mode at the time $t_{59}$ on a PCM frame present on the 8 output connections of C T $E_1$ (the switching operation in question is thus a time-division switching from the time 45 to the time 59).

The words leaving C T $E_1$ are entered, still in parallel mode, in a parallel-series buffer memory P $S_1$ which is a memory organised into $16 + 2n$ words of 8 bits which corresponds to 2 sub-memories of $8 + n$ words, as seen earlier on. This entry is made under the control of the parallel-series address memory M P $S_1$ which is a memory organised into 16 words and whose content is determined by the central control unit. The words of this memory are read synchronously with the channel times (it is thus read 16 times in the course of one frame of 256 words) and their content indicates the address where the words coming from C T $E_1$ are to be entered in P $S_1$. Apart from when the failures occur, the content of M P $S_1$ is steady and the addresses thus read follow one another from 1 to 8 and then from $9 + n$ to $16 + n$, which corresponds to the successive charging of the two half-memories of P $S_1$. In the example, the word 45 leaving C T $E_1$ at time 59 is entered in the word $11 + n$ of P $S_1$.

When one half-memory is full, charging of the following half-memory and reading of the first half-memory begin.

The 8 words used are read out simultaneously in series mode and under the control of an internal circuit brought into operation for example by an additional bit contained in the addresses read in M P $S_1$. Accordingly, these 8 words issue simultaneously from the memory on 8 connections in 8 channel times. In the example, the word $11 + n$ is thus read between the times $t_{65}$ and $t_{72}$ whereas the words 1 to 8 which were read between the times $t_{57}$ and $t_{64}$ are recharged from C T $E_1$.

The corresponding outputs of the half-memories are collected on OR gates, such as the gate 21, which enable the two outputs of the memory corresponding to the words of the same order of the two sub-memories to be obtained on one and the same connection. In the example, the gate 21 collects the connections corresponding to the words 3 and $11 + n$ (both having the order 3).

Each of these gates is connected to a matrix switch, such as C $S_3$. The gates connected to the same parallel-series buffer memory all terminate at different matrix switches (there are thus $8 + n$ C S), whilst the circuits of the same order of all the parallel-series buffer memories are all connected to the same matrix switch (which therefore has $m$ inputs). In the example, the gate 21 is connected to the input 1 of C $S_3$.

The matrix switches are elements which, as was seen earlier on, enable at least one incoming connection among $m$ to be connected to at least one outgoing connection among $m$.

In the example, the input 1 of C $S_3$ has to be connected to the output 4 of C $S_3$ throughout the period during which the word $11 + n$ is read in P $S_1$, i.e. from $t_{65}$ to $t_{72}$. To this end, a matrix address memory M A $S_3$ controls the necessary connections in C $S_3$. This M A S is a memory organised into 32 words whose content is determined by the central unit. It is read during the 256 channel times so as to be in phase with the beginning of a frame and so that the content of each word read therein is present during the 8 channel times for which the passage of the words representing the samples through the matrix switch lasts. The content of these words controls the structure of the connections in C $S_3$. In the example, the word No. 9 read between the times 65 and 72 indicates the connections necessary for establishing a path between the input 1 and the output 4 of C $S_3$.

The words issuing from the matrix switches are entered in series-parallel buffer memories S P which function symmetrically in relation to the parallel-series buffer memories. Each connection leaving a C S (there are therefore m per C S) terminates at a different S P (there are therefore m S P's), are each S P receives the $8 + n$ connections of the same number emanating from the $8 + n$ C S's.

In the example, S $P_4$ receives the connection coming from the output 4 of C $S_3$.

These series-parallel buffer memories are memories organized into $16 + 2n$ words of 8 bits, which correspond to 2 sub-memories of $8 + N$ words, as was seen earlier on. The two words of the same order in the 2 sub-memories receive the same connection emanating from the C S of corresponding order. In the example, the output 4 of C $S_3$ is connected to the words 3 and $11 + n$ of S $P_4$ (both having the order 3).

The 8 words used of one sub-memory are simultaneously filled in series mode by 8 words each emanating from a matrix switch during the 8 channel times where the paths through this switch are fixed and which correspond to the 8 channel times where these words are read in the parallel-series memory. Thus, the word $11 + n$ of S $P_4$ is filled between the times $t_{65}$ and $t_{72}$ by the words coming from the output 4 of C $S_3$.

At the same time, the 8 words of the other sub-memory are read one after the other in parallel mode for transmission through the time-division output switch C T $S_4$. Thus, this reading terminates when the first sub-memory is filled, after which the two sub-memories exchange the parts, the first being read in parallel mode and the second filled in series mode.

S $P_4$ is read under the control of the series-parallel adress memory M S $P_4$ which is a memory organised into 16 words and whose content is determined by the control unit. These words are read in synchronism with the channel times (the memory is thus read 16 times in the course of a frame of 256 words) and their content indicates the address where the words subsequently transmitted to C T $S_4$ have to be read in S $P_4$. These address words may also contain one additional bit for indicating to the internal entry circuit of S $P_4$ the sub-memory where the entry is to be made. Apart from when failures occur, the content of M S $P_4$ is steady and the addresses read therein follow one another from 1 to 8 and then from $9 + n$ to $16 + n$, which corresponds to the successive reading of the two sub-memories of S $P_4$. In the example, the word $11 + n$ of S $P_4$ is read at the time $t_{75}$.

The words emanating from S $P_4$ are entered in parallel mode in the time-division output switch C T $S_4$ which is a memory organised into 256 words of 8 bits.

This entry is made under the control of a time-division output address memory M A T $S_4$ which is a memory organised into 256 words and of which the content is determined by the control unit. This memory is read in synchronism with the channel times and the content of each word read therein gives the address of the word of C T $S_4$ where the word coming from S $P_4$ is to be entered. In the example, the word coming from S $P_4$ is entered in the word 12 of C T $S_4$ at the time $t_{75}$.

C T $S_4$ is read in parallel mode in synchronism with the channel times and in the natural order of succession of the words under the control of a circuit inside the memory. A P C M frame of 256 words is thus obtained on the output multiplex group G $S_4$. In the example, the word entered at the time $t_{75}$ is read at the time $t_{12}$ and is thus placed in the channel 12 of the output group G $S_4$. It is pointed out that, when a coded sample is entered in a word of C T $S_4$ whose address is below the entry channel time, this word is in fact read during the following frame which is unimportant, the delay thus introduced being constant.

In the event of a failure in C $S_3$, the connections passing through the words of order 3 in the parallel-series and series-parallel memories are broken, in particular the connection described above. Two remedies are possible:

1. the control unit stops allocating to the words of order 3 modulo 8 of M A T E's and of M A T S's addresses corresponding to channels in service in the input groups and output groups, and distributes the communications previously passing through C $S_3$ to the other matrix switches if any free paths are left there. This obviously results in an increase in the blocking level and complicates route finding, although it does show that a failure in a space-division switch does not mean that the exchange has to be taken out of service by virtue of the separation of this switch into 8 independent elements. However, it should be noted that this configuration may still arise in the event of successive failures exceeding the redundancy capacity of the matrix switches.

2. as in the example described, there is a redundancy where there are $n$ additional matrix switches and $2n$ additional words in the parallel-series and the series-parallel memories. In this case, the protection procedure comprises, on the one hand, modifying the content of the M P S's and the M S P's so as to replace the addresses of the words of order 3 in the P S's and S P's by the addresses of the words of order $8 + i$, and on the other hand charging the matrix address memory M A $S_{8+i}$ with the same content as M A $S_3$. Thus, the coded sample, whose path was previously followed, would on this occasion pass for example through the word $17 + n$ of P $S_1$ (controlled by the word $t_{59}/$ ad $17 + n$ of M P $S_1$) through the path ¼ of C $S_9$ (controlled by $t_{65/72}/$ ch ¼ of M A $S_9$) and through the word $17 + n$ of S $P_4$ (controlled by the word $t_{59}/$ ad $17 + n$ of M S $P_4$), the rest of the path in C T $E_1$ and hence C T $S_4$ being unchanged.

It will be noted that, in the complex formed by a matrix switch, its matrix address memory and the words of the parallel-series and series-parallel buffer memories which are connected to it, all these complexes are identical and independent. It is thus of advantage to standardise these complexes in such a way that the reading operations in series mode in the P $S_1$'s and entry operations in series mode in the S P's take place permanently both on the 2 n redundancy words and on the 2 × 8 words used in normal device. The circulation of the redundancy words will merely be of no significance in normal time and it will not be necessary to change the circuits from one to the other, the only intervention required comprising modifying the content of the M P S's and the M S P's just once and charging M A $S_{8+i}$ with the content of M A $S_3$. The work of the control unit is thus extremely simple and quick to carry out.

In the configuration thus described, it will be noted that the content of the parallel-series and series-parallel control memories is identical: M P $S_1 \equiv$ M S $P_1 \equiv$ M P $S_j \equiv$ M S $P_j$, so that it is entirely possible to use only one of these memories for controlling all the parallel-series and series-parallel buffer memories.

A preferred practical embodiment uses a redundancy of the order 1.

What is claimed is:

1. A time-division exchange for switching binary words of $k$ bits from a plurality of incoming parallel-mode P C M junctions to a plurality of output parallel-mode P C M junctions, said exchange comprising:

first time-division switching means connected to said incoming P C M junctions for delivering said binary words in parallel-mode;

parallel-series conversion means comprising a first memory for successively receiving said binary words from said first time-division switching means, a second memory for simultaneously delivering said binary words in series mode on respectively $k+n$ pluralities of input connections, and means for interchanging said first and second memories when said first memory is filled and said second memory is empty;

matrix switching means connected to said $k+n$ pluralities of input connections for delivering said binary words in series mode on $k+n$ pluralities of output connections; said matrix switching means being divided into $k+n$ independant distinct elements, each of said elements being connected respectively to one of said pluralities of input connections and to one of said pluralities of output connections and presenting to said binary words a plurality of paths between said input connections and said output connections;

series-parallel conversion means comprising a third memory for simultaneously receiving said binary words from said $k+n$ pluralities of output connections, a fourth memory for successively delivering said binary words in parallel-mode, and means for interchanging said third and fourth memories when said third memory is filled and said fourth memory is empty; and second time-division switching means connected to said series-parallel conversion means for delivering said binary words to said plurality of output parallel-mode P C M junctions.

2. An exchange as claimed in claim 1, wherein the parameter $n$ is equal to 0.

3. An exchange as claimed in claim 1, wherein the parameter $n$ is equal to 1.

4. An exchange as claimed in claim 1, further comprising control means for simultaneously controlling said parallel-series conversion means and said series-parallel conversion means by providing said parallel-series conversion means and said series-parallel conversion means respectively with two identical sets of control signals.

* * * * *